United States Patent Office 3,357,296
Patented Dec. 12, 1967

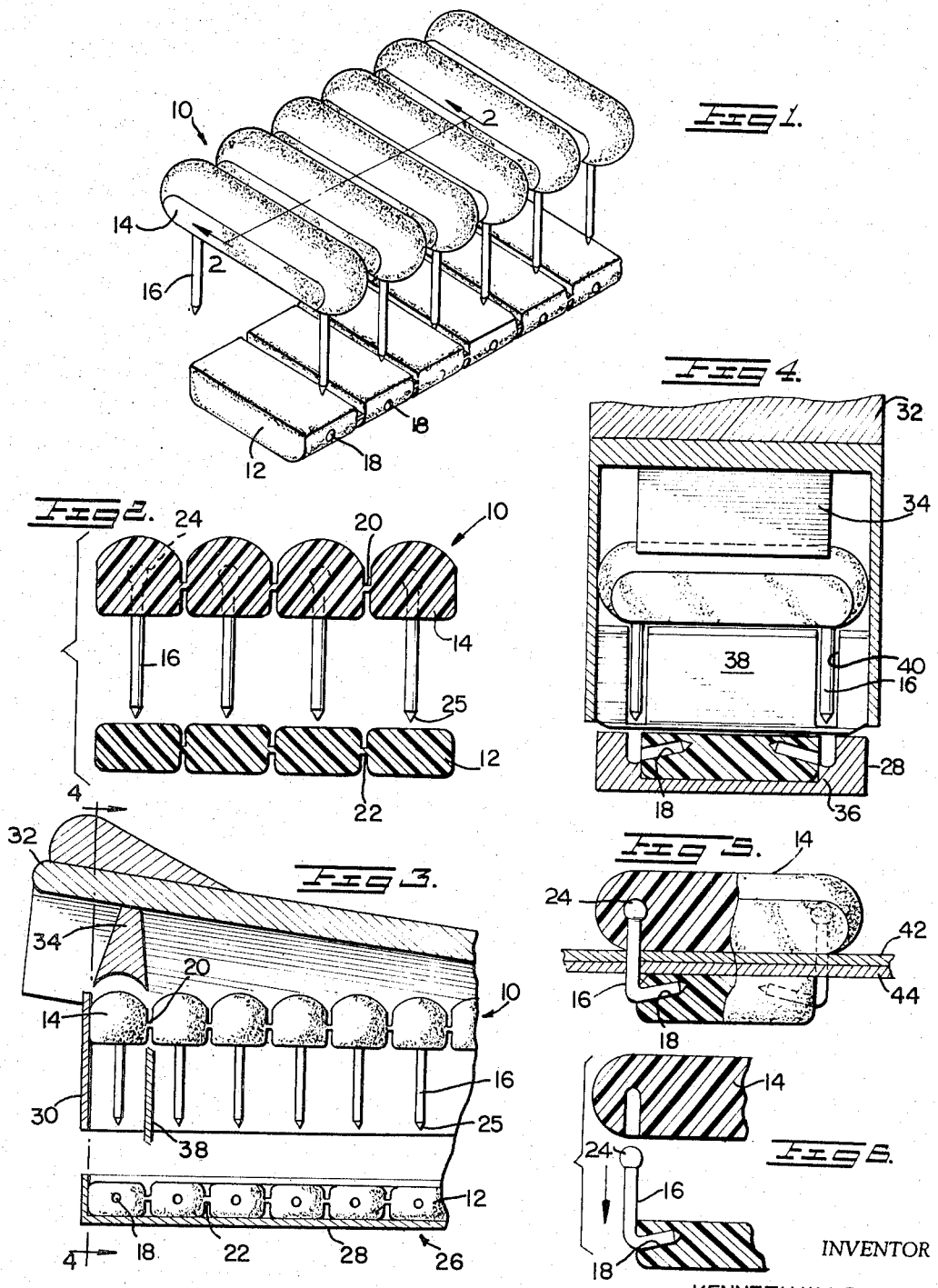

3,357,296
STAPLE FASTENER
Kenneth W. Lefever, 5914 Anniston Road,
Bethesda, Md. 20034
Filed May 14, 1965, Ser. No. 455,755
7 Claims. (Cl. 85—49)

This invention relates generally to fasteners and more particularly to an improved staple type fastener which is particularly suitable for use in fastening sheet material such as fabric or the like.

The staple fastener of the present art is ideally suited and is widely used for fastening or connecting sheet materials of many types. There is an existing need, however, for a staple fastener for use with or in association with fragile materials or with garments or similar articles wherein temporary adjustments or fastening is required. A primary example of one such use with clothing is in the art of diaper fastening which is presently accomplished with safety pins or like devices. Since safety pins are relatively difficult to manipulate, staple type fasteners would be more suitable for use as such a fastener. Prior art staples are, however, not particularly adapted for use with clothing primary because the sharp ends of the staple, even though bent over during fastening, remain exposed and prone to cause injury to the wearer or damage to other clothing when used on garments. Furthermore, conventional staples are generally unattractive and are subject to corrosion thereby limiting their use with clothing.

There are, of course, many other uses where the unenclosed ends of staple type fasteners are undesirable such for example as in fastening materials which will be in contact with fragile or expensive articles.

It is therefore an object of this invention to provide a staple type fastener which is particularly adapted for use in connection with surfaces which would be injured by conventional staples by furnishing a device in which the normally exposed sharp ends of the staple structure are encased and thereby isolated.

It is another object of this invention to provide a staple type fastener which is attractive and decorative and therefore suitable for use as a fastener on outer garments.

It is a further object of this invention to furnish an auxiliary structure for use with staple type fasteners wherein the sharp ends of the fastener are encased and isolated after fastening.

It is still another object of the invention to provide a staple type fastener which is easily, safely and quickly removable by hand without a requirement for special tools.

These and other objects of the invention will become better understood by reference to the following detailed description when viewed in the light of the accompanying drawings wherein like elements throughout the figures thereof are indicated by like numerals and wherein:

FIGURE 1 is a perspective view of a series of fasteners in accordance with the invention;

FIGURE 2 is a sectional view of a portion of the fasteners of FIGURE 1 taken along the line 2—2 thereof;

FIGURE 3 is a sectional elevation view partly broken away of a stapler containing fasteners in accordance with the invention;

FIGURE 4 is a sectional view of the stapler of FIGURE 3 taken along the line 4—4 thereof;

FIGURE 5 is a sectional elevational view of a fastener, in accordance with the invention, in a fastened configuration; and FIGURE 6 is a view similar to FIGURE 5 showing a portion of the fastener after disassembly.

In FIGURE 1, series of fasteners are shown in a preferred "magazine clip" arrangement, connected together so that they may be furnished as an integral unit for automatic or semiautomatic stapling machines. Each fastener is made up of a staple element, shown generally at 10 and an initially separate receiver element 12. The staple element comprises a cross member 14 with a leg 16 depending from either end thereof. The receiver element is provided with holes 18 in either end thereof for purposes to be described below.

Turning now to FIGURE 2, each staple element 10 is connected to the next adjacent staple element by a web 20 between the respective cross members 14. The web may be formed from the same material as the cross members 14 at the time of fabrication or may be formed by a suitable connecting adhesive as desired. The receiver elements 12 are similarly connected by a web 22.

As can be seen in FIGURE 2, the cross member 14 is formed in an enlarged cross section and is preferably made of a thermoplastic, thermosetting or other modable material. The configuration of this member may be of any suitable design, preferably decorative for use in conjunction with articles where a decorative or other effect is desired. The cross member 14 is also of sufficient width and depth to receive and hold the legs 16 as shown. The legs 16 are provided, at their upper end, with slightly enlarged portions 24, of suitable dimension to effectively retain the legs in the cross member against all forces save an intentional pull to remove the legs from this member. The other end of each leg 16 is furnished with a point 25 in the conventional manner.

An example of a stapling machine suitable for use with the fasteners of this invention is shown generally at 26 in FIGURE 3. This machine, in overall operation, is similar to conventional staplers and comprises a base 28, which holds the receiver elements 12, a magazine 30 for holding a "clip" of the staple elements 10 and a hammer section 32 pivotally connected to the base. A hammer 34 depends from the hammer section 32 to engage the forwardmost staple element 10 when the hammer section 32 is depressed.

As seen in FIGURE 4, an anvil 36 is formed in the base 28 and deflects the legs 16 in a conventional manner when the hammer 34 is pressed downwardly. A knife 38, is supported from the magazine 30 for severing the webs 20 and 22 between the foremost and next adjacent of the staple elements 10 when the hammer section 32 is depressed. Openings 40 are provided in the knife 38 to permit passage of the legs 16 thereby.

FIGURE 5 illustrates the completed fastener joining two layers of material 42 and 44. In operation, the material to be fastened is disposed between the hammer section 32 and the anvil 36 in a conventional manner. The hammer section 32 is then depressed and the hammer 34 engages the cross member 14 of the leading staple element 10. Depression of the hammer section also causes a depression of the magazine 30 until it engages the base 28. Depression of the magazine 30 causes the lower edge of the knife 38 to engage and sever the web 22 between the leading receiver element 12 and the receiver element next adjacent thereto. As the staple element is depressed, the upper edge of the knife 38 engages the web 20 between the leading staple element and the element next adjacent thereto severing the leading element from the series of elements. Further depression of the leading staple element causes the legs 16 to pierce the layers 42 and 44 (FIGURE 6) and engage the anvil 36 (FIGURE 4) and, as seen in FIGURE 6, bend inwardly so that the lower ends of the legs 16 enter the holes 18 in the receiver element. The completed fastener thereby provides a connection which may be, by proper design of the cross member 14 and/or receiver element 12, decorative, and which is by proper selection of the materials in the various elements making up the fastener, preferably non-corroding. The legs 16 are also preferably formed from a non-corrodible metal such as copper or aluminum-coated metal, or a malleable plastic such as polyethene or the like. In addition to the decorative effect, the fastener, encases the points 25 so that they are prevented from causing injury to adjacent material or to the body of the wearer when the fastener is used on clothing.

Simple removal of the fastener is provided, in this invention, by anchoring the legs 16 in the cross member 14 so that by gripping either the receiver element 12 or the cross member 14 and exerting a pull thereon normal to the connected material the legs are released from the cross member. As seen in FIGURE 6, a normal pull will release the upper portions of the legs 16 from the cross member 14 and, with a continuing pull on the receiver element 22, draw the legs through the layers 42 and 44 thereby removing the fastener. Although enlarged portions 24 are shown formed on the upper portion of the legs 16, the frictional force between the legs 16 and the cross member 14 may be sufficient to retain the legs against the usual separating forces encountered in use so that the exact configuration of the legs will depend on the results of actual tests. The primary requirements are, however, sufficient retention against usual normal forces with provision of release under sufficient intentional removal force.

The embodiments set forth above are intended as exemplary to enable those skilled in the art to understand the teachings of the invention and, therefore, within the limits of the appended claims, the invention may be practiced other than as specifically described.

What is new and therefore desired to be protected by Letters Patent of the United States is:

1. A fastener for connecting sheet articles comprising a staple element and an elongated receiving element, said staple element including a cross member, independent legs detachably mounted in said cross member proximate each end thereof and dependin gtherefrom in parallel coplanar relation to one another, said receiving element having a pair of holes adjacent the ends thereof with at least a portion of said holes being in opposed relationship, said holes being configured to receive the legs of said staple element after said legs are bent inwardly during the driving operation whereby disposition of said staple element and receiving element in alignment on opposite sides of the articles to be connected followed by displacement of said staple element toward said receiving element to pierce said article with said legs and to insert said legs into the holes of said receiving element connects said articles and encases the free ends of said legs in said holes, and means to retain said legs in said holes.

2. A fastener in accordance with claim 1 wherein means are provided to detachably connect said legs to said cross member, and wherein the strength of the means retaining said legs in said holes is of greater magnitude than the strength of the means detachably connecting said legs to said cross member, whereby said fastener is removed from said article by detaching said legs from said cross member through application of a sufficient force to move said cross member away from said receiving element.

3. A fastener in accordance with claim 2 wherein said cross member is formed of a moldable material greater in cross sectional dimension than said legs and wherein an end portion of each of said legs are embedded in said cross member to detachably connect said legs to said cross member through the frictional force between the cross member and the embedded portion of the leg.

4. A fastener for connecting sheet articles comprising a staple element and an elongated receiving element, said staple element including a cross member, independent legs detachably mounted in said cross member proximate each end thereof and depending therefrom in parallel coplanar relation to one another, said receiving element having a pair of holes adjacent the ends thereof with at least a portion of said holes being in opposed relationship, said holes being configured to receive the legs of said staple element after said legs are bent inwardly during the driving operation, whereby disposition of said staple element and receiving element in parallel alignment on opposite sides of the articles to be connected followed by sequential displacement of said staple element toward said receiving element to pierce said article with said legs and suitable deflection of said legs for insertion thereof into the holes of said receiving element connects said articles and encases the free ends of said legs.

5. A fastener in accordance with claim 4 wherein means are provided to detachably connect said legs to said cross member, and wherein the strength of the means detachably connecting said legs to said cross member is substantially less than the force necessary to deflect said legs to provide withdrawal thereof from said holes, whereby said fastener is removed from said articles by detaching said legs from said cross members through application of a sufficient force to move said cross member away from said receiving element.

6. A fastener in accordance with claim 5 wherein said cross member is formed of a moldable material greater in cross sectional dimension than said legs and wherein an end portion of each of said legs are embedded in said cross member to detachably connect said legs to said cross member through the frictional force between the cross member and the embedded portion of the leg.

7. A fastener for connecting sheet articles comprising a synthetic plastic cross member, a pair of independent legs embedded in said cross member proximate either end thereof and bonded thereto to be detachably retained thereby, said legs depending from said cross member in perpendicular relationship thereto and in parallel coplanar relationship to one another, said legs having penetrating points at the free ends thereof, the surface of the embedded portions of said legs being substantially smooth throughout the length thereof so as to be devoid of abrupt abutments, said legs further being deformable to fasten articles when inserted therethrough and deformed therebehind, the force required to straighten said legs when deformed being greater than the strength of the bond between said legs and said cross member, whereby said legs may be detached from said cross member to release the sheet articles.

References Cited
UNITED STATES PATENTS

| | | | |
|---|---|---|---|
| 2,451,487 | 10/1948 | Huelster | 85—49 |
| 3,076,373 | 3/1963 | Matthews | 85—49 |
| 3,241,797 | 3/1966 | Anderson | 85—49 |

CARL W. TOMLIN, *Primary Examiner.*

R. S. BRITTS, *Assistant Examiner.*